(12) United States Patent
Mitsui

(10) Patent No.: US 9,454,711 B2
(45) Date of Patent: Sep. 27, 2016

(54) DETECTION DEVICE, LEARNING DEVICE, DETECTION METHOD, LEARNING METHOD, AND INFORMATION STORAGE DEVICE

(71) Applicant: OLYMPUS CORPORATION, Tokyo (JP)

(72) Inventor: Masanori Mitsui, Machida (JP)

(73) Assignee: OLYMPUS CORPORATION, Tokyo (JP)

( * ) Notice: Subject to any disclaimer, the term of this patent is extended or adjusted under 35 U.S.C. 154(b) by 43 days.

(21) Appl. No.: 14/290,006

(22) Filed: May 29, 2014

(65) Prior Publication Data

US 2014/0355826 A1  Dec. 4, 2014

(30) Foreign Application Priority Data

May 30, 2013 (JP) .................................. 2013-113677

(51) Int. Cl.
*G06K 9/00* (2006.01)
*G06K 9/46* (2006.01)
*G06K 9/62* (2006.01)

(52) U.S. Cl.
CPC ......... *G06K 9/4652* (2013.01); *G06K 9/00147* (2013.01); *G06K 9/6269* (2013.01); *G06K 9/6293* (2013.01)

(58) Field of Classification Search
None
See application file for complete search history.

(56) References Cited

U.S. PATENT DOCUMENTS

| 8,165,370 B2* | 4/2012 | Inoue et al. | ................... 382/128 |
| 2009/0147999 A1* | 6/2009 | Maeda et al. | ................ 382/106 |
| 2011/0254937 A1 | 10/2011 | Yoshino | |

FOREIGN PATENT DOCUMENTS

| JP | 2002-342758 A | | 11/2002 |
| JP | 2002342758 A | * | 11/2002 |
| JP | 2011-224038 A | | 11/2011 |

* cited by examiner

*Primary Examiner* — Stephen R Koziol
*Assistant Examiner* — Raphael Schwartz
(74) *Attorney, Agent, or Firm* — Scully, Scott, Murphy & Presser, PC

(57) ABSTRACT

A detection device includes an image acquisition section that acquires an image that has been captured by an imaging section, and includes an image of an object, a distance information acquisition section that acquires distance information based on a distance from the imaging section to the object when the imaging section has captured the image, a feature quantity calculation section that calculates a feature quantity from the acquired image, the feature quantity relating to at least one of a color, a brightness, a color difference, and a spectrum of the object, a learning feature quantity storage section that stores a learning feature quantity calculated by a learning process based on the distance from the imaging section to the object, and a detection section that detects a target area from the image based on the learning feature quantity, the distance information, and the feature quantity.

14 Claims, 12 Drawing Sheets

FIG. 8A
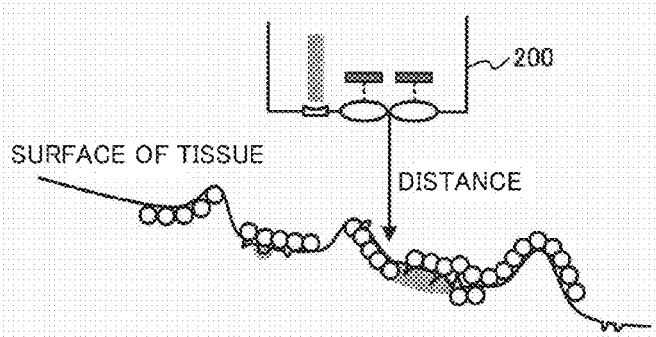
FIG. 8B  CLOSING PROCESS
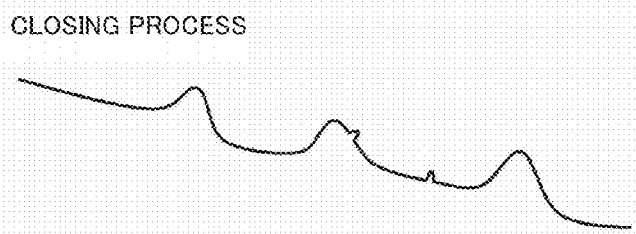
FIG. 8C  DETECTION OF RECESSES
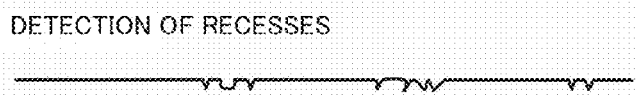
FIG. 8D  OPENING PROCESS
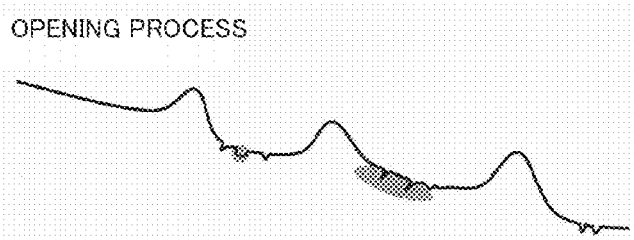
FIG. 8E  DETECTION OF PROTRUSIONS
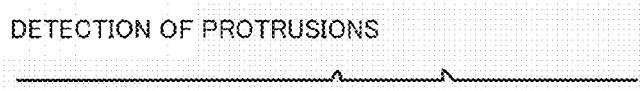
FIG. 8F  CHANGE RADIUS OF SPHERE CORRESPONDING TO DISTANCE
PART OF DISTANCE MAP
OBJECT IS CAPTURED DARKLY AS DISTANCE INCREASES,
AND CAPTURED BRIGHTLY AS DISTANCE DECREASES FIG. 9A
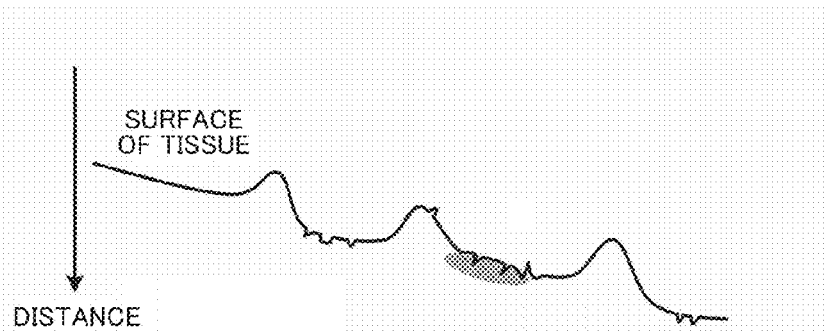
FIG. 9B
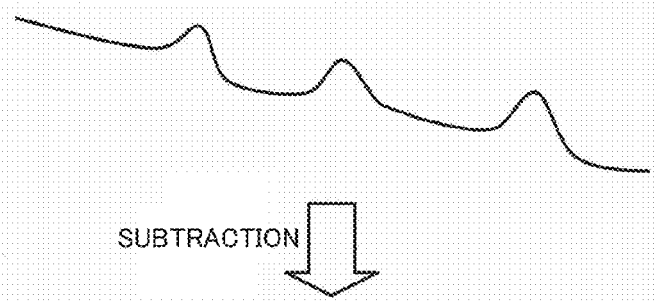
FIG. 9C
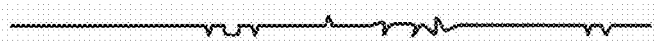
FIG. 9D
CHANGE CHARACTERISTICS OF LOW-PASS FILTER
CORRESPONDING TO DISTANCE
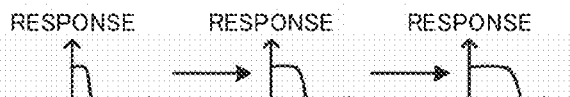
PART OF DISTANCE MAP
OBJECT IS CAPTURED DARKLY AS DISTANCE INCREASES,
AND CAPTURED BRIGHTLY AS DISTANCE DECREASES

DETECTION DEVICE, LEARNING DEVICE, DETECTION METHOD, LEARNING METHOD, AND INFORMATION STORAGE DEVICE

Japanese Patent Application No. 2013-113677 filed on May 30, 2013, is hereby incorporated by reference in its entirety.

BACKGROUND

The present invention relates to a detection device, a learning device, a detection method, a learning method, an information storage device, and the like.

A narrow band imaging (NBI) technique has been known that applies narrow-band illumination light that is easily absorbed by hemoglobin in blood to tissue to highlight the capillaries and the like on the surface of the mucous membrane (see JP-A-2011-224038). The narrow band imaging technique has been expected to be an alternative to a dye-spraying observation technique that is widely used to perform detailed diagnosis on the gullet or observe the pit pattern (gland duct structure) of the large intestine, and contribute to an improvement in the examination efficiency through a reduction in the examination time or the need to perform biopsy.

A technique has been proposed that focuses on the fact that the nerves that surround the target internal organ are situated in the fat layer, and extracts the fat situated around the nerves in order to visualize the nerves to prevent a situation in which the nerves that surround the target internal organ are damaged.

JP-A-2002-342758 discloses a technique that utilizes a learning process as a technique for recognizing or extracting a specific area from an image. Specifically, the extraction target area is learned, and a specific area is extracted from the input image using a parameter obtained by learning.

When acquiring an identical feature as an image, a difference in illumination state, a difference in intensity, or the like may occur, and the feature may show different characteristics depending on the distance from the imaging device to the object. If the feature quantities corresponding to different characteristics are classified into an identical category, the learning data shows a large variation in feature quantity within an identical category. As a result, the determination accuracy (the accuracy of the learning results) and the detection accuracy may deteriorate. It may be possible to implement stable detection by acquiring distance information together with an image, and performing a detection process. JP-A-2002-342758 discloses a robot visual recognition system that utilizes an image and distance information. The system disclosed in JP-A-2002-342758 normalizes the acquired image using the distance, and performs a learning process and a recognition process. The system disclosed in JP-A-2002-342758 corrects the size or the pattern fineness that differs depending on the distance using the distance information.

SUMMARY

According to one aspect of the invention, there is provided a detection device comprising:

an image acquisition section that acquires an image that has been captured by an imaging section, and includes an image of an object;

a distance information acquisition section that acquires distance information based on a distance from the imaging section to the object when the imaging section has captured the image;

a feature quantity calculation section that calculates a feature quantity from the acquired image, the feature quantity relating to at least one of a color, a brightness, a color difference, and a spectrum of the object;

a learning feature quantity storage section that stores a learning feature quantity calculated by a learning process based on the distance from the imaging section to the object; and a detection section that detects a target area from the image based on the learning feature quantity, the distance information, and the feature quantity, the learning feature quantity storage section storing the learning feature quantity based on the feature quantity that has been subjected to a correction process based on the distance information, and the detection section performing the correction process on the feature quantity calculated by the feature quantity calculation section based on the distance information acquired by the distance information acquisition section, and detecting the target area based on the feature quantity that has been subjected to the correction process, and the learning feature quantity.

According to another aspect of the invention, there is provided a detection method comprising:

acquiring an image that has been captured by an imaging section, and includes an image of an object;

acquiring distance information based on a distance from the imaging section to the object when the imaging section has captured the image;

calculating a feature quantity from the acquired image, the feature quantity relating to at least one of a color, a brightness, a color difference, and a spectrum of the object;

acquiring a learning feature quantity calculated by a learning process based on the distance from the imaging section to the object, and detecting a target area from the image based on the learning feature quantity, the distance information, and the feature quantity; and calculating the learning feature quantity based on the feature quantity that has been subjected to a correction process based on the distance information as the learning process based on the distance.

According to another aspect of the invention, there is provided a learning method comprising causing a computer to perform:

a process that acquires an image that has been captured by an imaging section, and includes an image of an object;

a distance information acquisition process that acquires distance information based on a distance from the imaging section to the object when the imaging section has captured the image;

a feature quantity calculation process that calculates a feature quantity from the acquired image, the feature quantity relating to at least one of a color, a brightness, a color difference, and a spectrum of the object;

a learning process that learns the feature quantity that has been calculated by the feature quantity calculation process and corresponds to the object based on the distance information acquired by the distance information acquisition process; and a learning feature quantity storage process that stores a learning feature quantity calculated by the learning process, the learning feature quantity storage process storing the learning feature quantity based on the feature quantity that has been subjected to a correction process based on the distance information.

According to another aspect of the invention, there is provided a computer-readable storage device with an executable program stored thereon, wherein the program instructs a computer to perform steps of:

acquiring an image that has been captured by an imaging section, and includes an image of an object;

acquiring distance information based on a distance from the imaging section to the object when the imaging section has captured the image;

calculating a feature quantity from the acquired image, the feature quantity relating to at least one of a color, a brightness, a color difference, and a spectrum of the object;

acquiring a learning feature quantity calculated by a learning process based on the distance from the imaging section to the object; and detecting a target area from the image based on the learning feature quantity, the distance information, and the feature quantity, the step of acquiring the learning feature quantity including storing the learning feature quantity based on the feature quantity that has been subjected to a correction process based on the distance information, and the step of detecting the target area from the image including performing the correction process on the calculated feature quantity based on the distance information, and detecting the target area based on the feature quantity that has been subjected to the correction process, and the learning feature quantity.

According to another aspect of the invention, there is provided a computer-readable storage device with an executable program stored thereon, wherein the program instructs a computer to perform steps of:

acquiring an image that has been captured by an imaging section, and includes an image of an object;

acquiring distance information based on a distance from the imaging section to the object when the imaging section has captured the image;

calculating a feature quantity from the acquired image, the feature quantity relating to at least one of a color, a brightness, a color difference, and a spectrum of the object;

performing a learning process on the feature quantity that corresponds to the object based on the distance information; and storing a learning feature quantity calculated by the learning process, the step of storing the learning feature quantity including storing the learning feature quantity based on the feature quantity that has been subjected to a correction process based on the distance information.

BRIEF DESCRIPTION OF THE DRAWINGS

FIGS. 8A to 8F are views illustrating a process that extracts extracted irregularity information using a morphological process.

FIGS. 9A to 9D are views illustrating a process that extracts extracted irregularity information using a filtering process.

DESCRIPTION OF EXEMPLARY EMBODIMENTS

Figure 1:
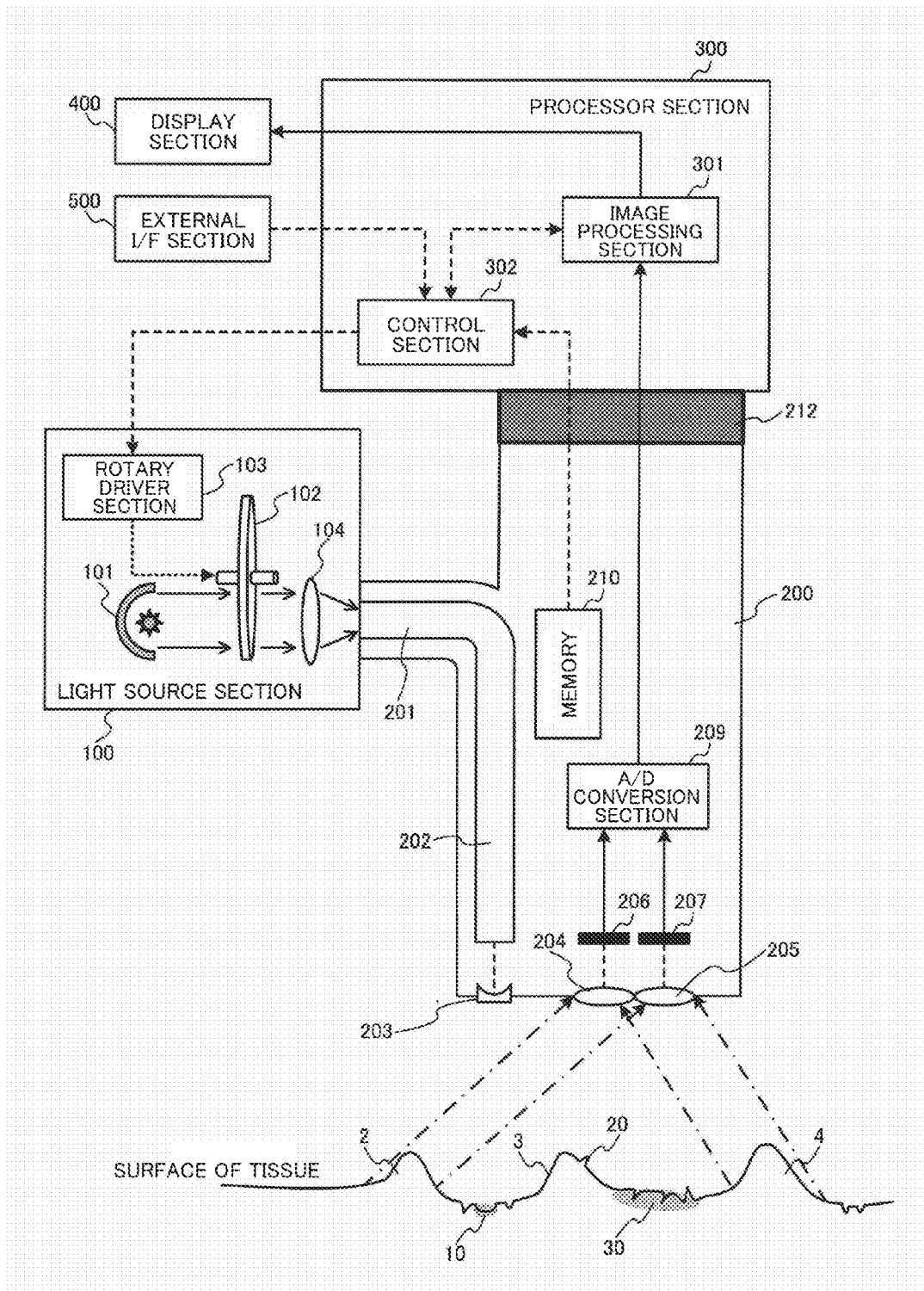
FIG. 1 illustrates a configuration example of an endoscope apparatus that includes a detection device according to one embodiment of the invention.

According to one embodiment of the invention, there is provided a detection device comprising:

an image acquisition section that acquires an image that has been captured by an imaging section, and includes an image of an object;

a distance information acquisition section that acquires distance information based on a distance from the imaging section to the object when the imaging section has captured the image;

a feature quantity calculation section that calculates a feature quantity from the acquired image, the feature quantity relating to at least one of a color, a brightness, a color difference, and a spectrum of the object;

a learning feature quantity storage section that stores a learning feature quantity calculated by a learning process based on the distance from the imaging section to the object; and a detection section that detects a target area from the image based on the learning feature quantity, the distance information, and the feature quantity, the learning feature quantity storage section storing the learning feature quantity based on the feature quantity that has been subjected to a correction process based on the distance information, and the detection section performing the correction process on the feature quantity calculated by the feature quantity calculation section based on the distance information acquired by the distance information acquisition section, and detecting the target area based on the feature quantity that has been subjected to the correction process, and the learning feature quantity.

According to another embodiment of the invention, there is provided a detection method comprising:

acquiring an image that has been captured by an imaging section, and includes an image of an object;

acquiring distance information based on a distance from the imaging section to the object when the imaging section has captured the image;

calculating a feature quantity from the acquired image, the feature quantity relating to at least one of a color, a brightness, a color difference, and a spectrum of the object;

acquiring a learning feature quantity calculated by a learning process based on the distance from the imaging section to the object, and detecting a target area from the image based on the learning feature quantity, the distance information, and the feature quantity; and calculating the learning feature quantity based on the feature quantity that has been subjected to a correction process based on the distance information as the learning process based on the distance.

According to another embodiment of the invention, there is provided a learning method comprising causing a computer to perform:

a process that acquires an image that has been captured by an imaging section, and includes an image of an object;

a distance information acquisition process that acquires distance information based on a distance from the imaging section to the object when the imaging section has captured the image;

a feature quantity calculation process that calculates a feature quantity from the acquired image, the feature quantity relating to at least one of a color, a brightness, a color difference, and a spectrum of the object;

a learning process that learns the feature quantity that has been calculated by the feature quantity calculation process and corresponds to the object based on the distance information acquired by the distance information acquisition process; and a learning feature quantity storage process that stores a learning feature quantity calculated by the learning process, the learning feature quantity storage process storing the learning feature quantity based on the feature quantity that has been subjected to a correction process based on the distance information.

According to another embodiment of the invention, there is provided a computer-readable storage device with an executable program stored thereon, wherein the program instructs a computer to perform steps of:

acquiring an image that has been captured by an imaging section, and includes an image of an object;

acquiring distance information based on a distance from the imaging section to the object when the imaging section has captured the image;

calculating a feature quantity from the acquired image, the feature quantity relating to at least one of a color, a brightness, a color difference, and a spectrum of the object;

acquiring a learning feature quantity calculated by a learning process based on the distance from the imaging section to the object; and detecting a target area from the image based on the learning feature quantity, the distance information, and the feature quantity, the step of acquiring the learning feature quantity including storing the learning feature quantity based on the feature quantity that has been subjected to a correction process based on the distance information, and the step of detecting the target area from the image including performing the correction process on the calculated feature quantity based on the distance information, and detecting the target area based on the feature quantity that has been subjected to the correction process, and the learning feature quantity.

According to another embodiment of the invention, there is provided a computer-readable storage device with an executable program stored thereon, wherein the program instructs a computer to perform steps of:

acquiring an image that has been captured by an imaging section, and includes an image of an object;

acquiring distance information based on a distance from the imaging section to the object when the imaging section has captured the image;

calculating a feature quantity from the acquired image, the feature quantity relating to at least one of a color, a brightness, a color difference, and a spectrum of the object;

performing a learning process on the feature quantity that corresponds to the object based on the distance information; and storing a learning feature quantity calculated by the learning process, the step of storing the learning feature quantity including storing the learning feature quantity based on the feature quantity that has been subjected to a correction process based on the distance information.

1. Method

A method employed in connection with several exemplary embodiments of the invention is described below. As described above taking an example of the fat detection technique that is used to suppress nerve damage, it is useful to detect the desired object from the captured image based on various types of information (e.g., color, brightness, or color difference). In this case, it is necessary to determine whether or not the object in the image is the desired object using the color, the brightness, the color difference, and the like as feature quantities.

Figure 5A:
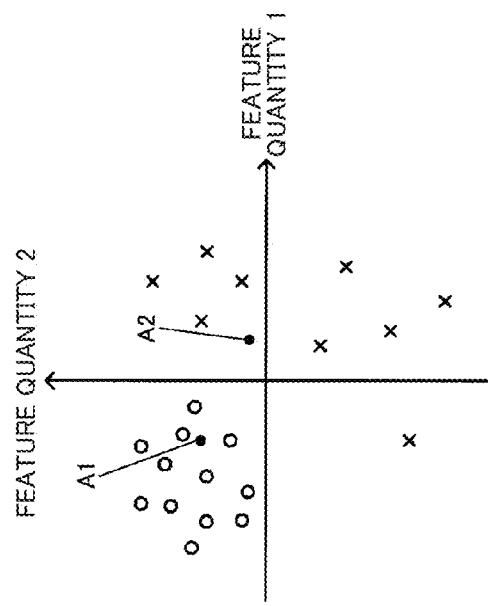
FIGS. 5A to 5D are views illustrating an example of a learning process.

When implementing such a determination process (detection process) that detects the desired object, it is useful to perform a learning process, and utilize the results of the learning process (hereinafter referred to as "learning results") (classification model in a narrow sense)). A specific example of the learning process is briefly described below. A piece of processing target data is represented by a single feature quantity or a set of a plurality of feature quantities. For example, when using the brightness value Y of the image as the feature quantity, a piece of processing target data is represented by the brightness value Y. When using the pixel values (R, G, B) of a color image as the feature quantity, a piece of processing target data is represented by a set of the pixel values (R, G, B). Note that the feature quantity calculated from the image is not limited to the pixel values (RGB) or the brightness/color difference (YCrCb). The feature quantity may be the results obtained by performing a feature quantity calculation process on these values. In this case, a piece of processing target data can be plotted as one point in a feature quantity space that is set by assigning one axis to each feature quantity. FIG. 5A illustrates an example when using two feature quantities. In this case, the feature quantity space is formed by a plane (feature quantity plane), and a piece of processing target data corresponds to one point in the plane.

Figure 5B:
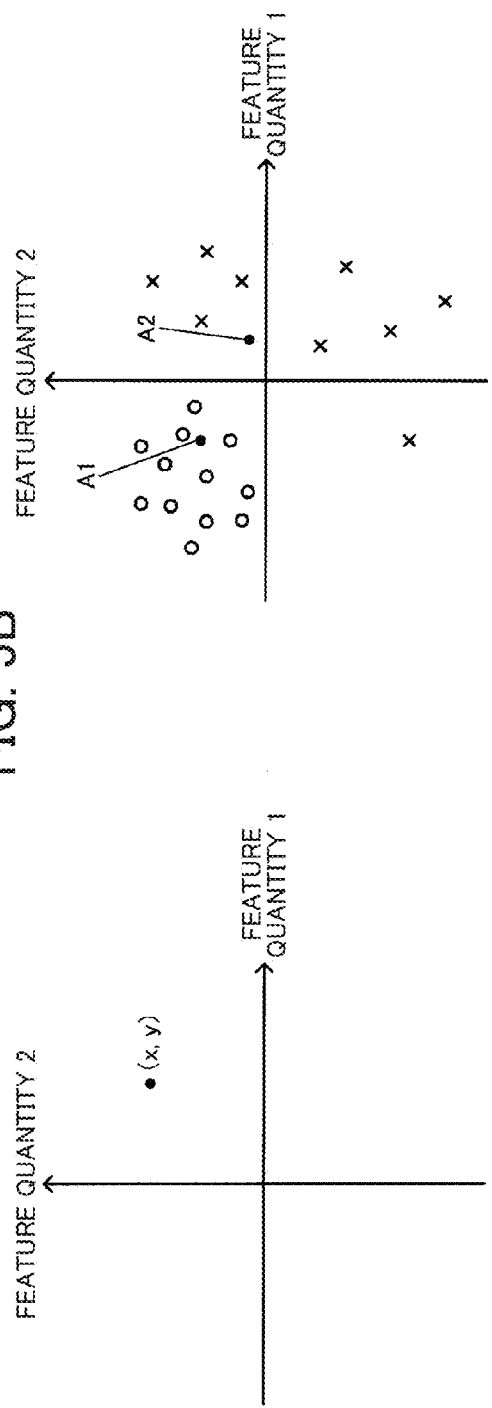

When implementing general learning (particularly supervised learning), given data is input during the learning process together with correct answer/incorrect answer information. For example, the input value is input together with information that indicates that the input value (feature quantity) is (or is not) fat. In the learning process, data that is known to be a correct answer or an incorrect answer is plotted in the feature quantity space. FIG. 5B illustrates an example of the plotting results. In FIG. 5B, each circle indicates the position of correct answer data, and each cross indicates the position of incorrect answer data. When the feature quantity is appropriately set (i.e., when the feature quantity differs depending on whether the value is a correct answer or an incorrect answer), the correct answer data is plotted in a given area of the feature quantity space, and the incorrect answer data is plotted in an area differing from that of the correct answer data (see FIG. 5B).

Figure 5C:
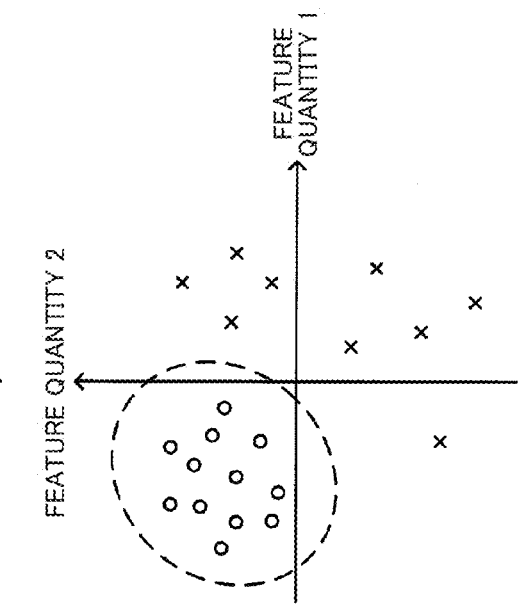
Figure 5D:
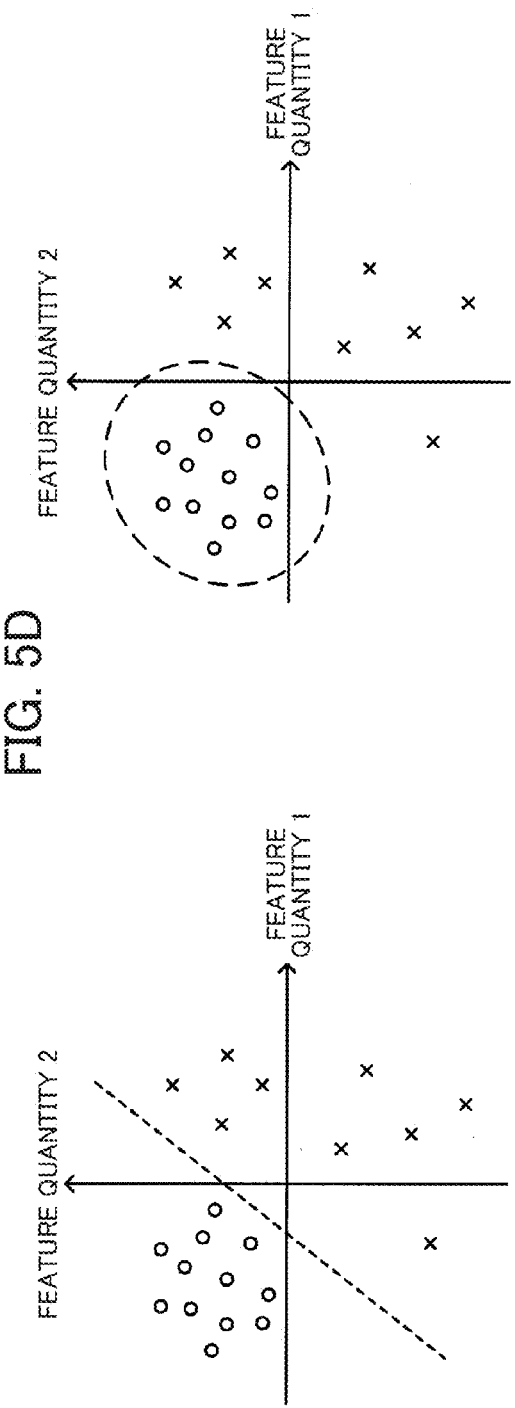

When the results illustrated in FIG. 5B have been obtained, and data that is unknown to be a correct answer or an incorrect answer has been acquired during the detection process, the object that corresponds to the acquired data is determined to be a correct answer (desired object) when the acquired data has been plotted at the position indicated by A1 in FIG. 5B, and is determined to be an incorrect answer when the acquired data has been plotted at the position indicated by A2 in FIG. 5B. Specifically, the learning process determines the boundary between the correct answer data area and the incorrect answer data area in the feature quantity space. For example, when the results illustrated in FIG. 5B have been obtained, the boundary (learning results) is determined as illustrated in FIG. 5C or 5D. When data that is unknown to be a correct answer or an incorrect answer has been input, whether the detection target data is included in the correct answer data area or the incorrect answer data area is determined based on the boundary. Note that the boundary may be set in various ways (see FIGS. 5C and 5D). Since the learning process is a known process, further description thereof is omitted. Although FIGS. 5A to 5D illustrate an example in which the feature quantity space is formed by a plane, a third-order or higher order feature quantity space may also be used. When distinguishing first to Nth objects (and the object other than the first to Nth objects) from each other, a plurality of boundaries may be set in the feature quantity space.

An example of the learning process has been described above. Such a learning process is designed on the assumption that an object having given characteristics has a given feature quantity (ideally a constant feature quantity). For example, when a certain fat is captured to obtain a plurality of images, the feature quantity calculated from each image is ideally identical. Since the position in the feature quantity space corresponds to the characteristics of the processing target data, the relationship fails, and it is impossible to appropriately set the boundary if the characteristics corresponding to an identical position are not identical. This also applies to the detection process that utilizes the learning results. Specifically, the detection results differ depending on the position in the feature quantity space at which the detection target data is plotted (see A1 and A2 in FIG. 5B). If the object corresponding to the detection target data is identical, the detection target data must be plotted at an identical position in the feature quantity space. The detection process is hindered when the plotted position varies (i.e., when the feature quantity to be calculated varies).

However, it may be impossible to apply the above assumption depending on the distance between the imaging section and the object. For example, the imaging target of an endoscope apparatus described later with reference to FIG. 1 is tissue or the like. When capturing an image using the endoscope apparatus, it is necessary to apply illumination light to the object since ambient light (e.g., sunlight or illumination light emitted from overhead lighting) is absent. In the example illustrated in FIG. 1, light emitted from a light source section 100 is passed through a light guide fiber 201, and applied to the object through an illumination lens 203.

Since intense light is applied to an object that is situated close to the imaging section, the imaging section receives intense reflected light. On the other hand, since weak light is applied to an object that is situated away from the imaging section due to attenuation of light corresponding to the distance, the imaging section receives weak reflected light. Specifically, the color of the object differs depending on the distance from the imaging section even when the object has identical characteristics (e.g., identical object). Therefore, it is necessary to take account of the effects of the distance in order to implement an appropriate learning process or detection process.

Figure 6A:
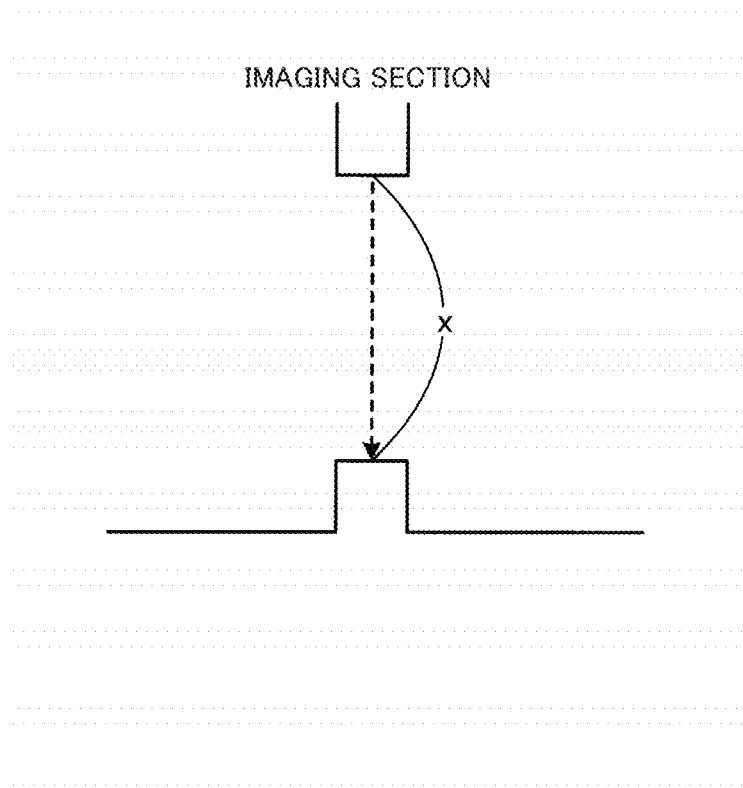
FIGS. 6A and 6B are views illustrating a change in feature quantity due to the irregular structure of the object.
Figure 6B:
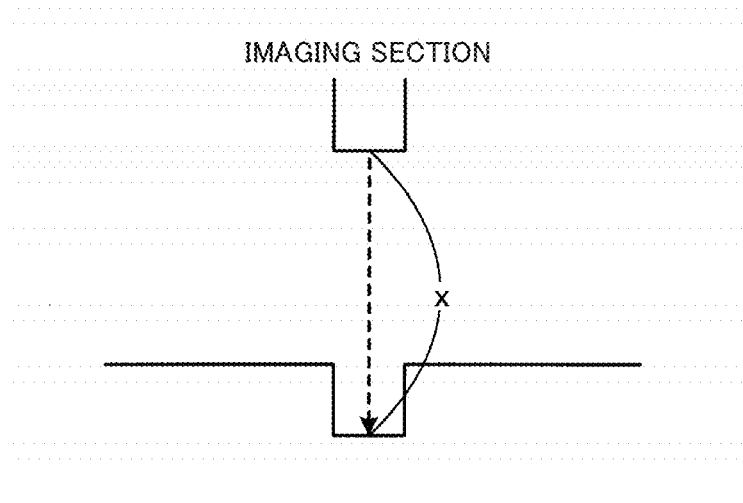

It is desirable to also take account of the effects of structural information (irregularities) about the object in addition to the distance. For example, the object corresponding to the pixel at a given position within the image is situated at a distance x from the imaging section. However, even when an object having identical characteristics is situated at the distance x from the imaging section, the intensity of light that reaches the object differs between FIG. 6A and FIG. 6B, and the object has a different color or the like within the captured image. In FIG. 6A, the target object is part of a protrusion structure. Therefore, it is likely that light reflected by the object situated around the target object, and scattered light reach the target object, in addition to illumination light that directly reaches the target object, and the target object is captured relatively brightly. In FIG. 6B, the target object is part of a recess structure. Therefore, it is likely that scattered light and the like do not sufficiently reach the target object, and the target object is captured darkly as compared with FIG. 6A. As a result, the characteristics (i.e., feature quantity) observed within the image differ although the distance from the imaging section is identical.

Several aspects of the invention propose a method that implements at least one of a learning process and a detection process using distance information based on the distance from the imaging section to the object. Specifically, the learning process and/or the detection process is performed based on the distance information or irregularity information specified based on the distance information.

Figure 7A:
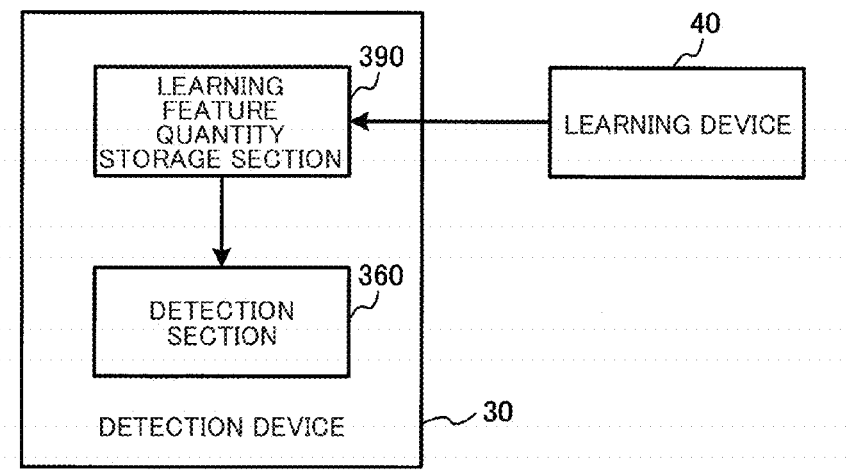
FIG. 7A illustrates an example in which a detection device and a learning device are separately provided.
Figure 7B:
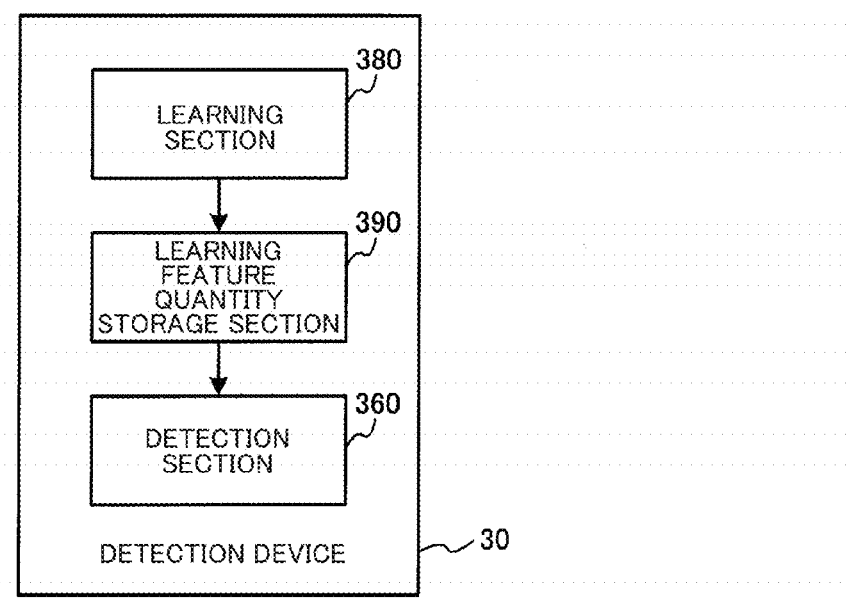
FIG. 7B illustrates an example in which a detection device includes a learning device.

Note that a learning device and a detection device may be provided separately (see FIG. 7A). In this case, the method may be applied to the learning device or the detection device. The method may be applied to a detection device that includes a learning section (see FIG. 7B). In this case, the detection device performs both the learning process and the detection process. Although the following specific embodiments illustrate a detection device that includes a learning section 380 (see FIG. 7B), the following specific embodiments may similarly be applied to the case where the learning device and the detection device are provided separately (see FIG. 7A).

2. System Configuration Example

The embodiments of the invention are described in detail below. Although an example in which the embodiments of the invention are applied to an endoscope apparatus is described below, the embodiments of the invention may similarly be applied to an apparatus other than an endoscope apparatus since the above problem due to the distance or irregularities similarly occurs when it is likely that it is necessary to provide illumination light due to the absence of ambient light (e.g., when capturing a dark area using a normal digital video camera). The imaging device (e.g., endoscope apparatus) and the detection device may be provided separately.

FIG. 1 is a functional block diagram illustrating an endoscope apparatus that includes a detection device according to one embodiment of the invention. As illustrated in FIG. 1, the endoscope apparatus includes a light source section 100, an imaging section 200, a processor section 300, a display section 400, and an external I/F section 500. Note that the configuration of the endoscope apparatus is not limited to the configuration illustrated in FIG. 1. Various modifications may be made, such as omitting some of the elements illustrated in FIG. 1, or adding other elements. Note that various modifications may also be made of the configurations illustrated in the remaining drawings (block diagrams).

The light source section 100 includes a white light source 101, a rotary color filter 102 that has a plurality of spectral transmittances, a rotary driver section 103 that drives the rotary color filter 102, and a condenser lens 104 that focuses the light that has passed through the rotary color filter 102 and has spectral characteristics on the incident end face of a light guide fiber 201.

The rotary color filter 102 includes a red color filter, a green color filter, a blue color filter, and a rotary motor.

The rotary driver section 103 rotates the rotary color filter 102 at a given rotational speed in synchronization with the imaging period of an image sensor 206 based on a control signal output from a control section 302 included in the processor section 300. For example, when the color filter is rotated at 20 revolutions per second, each color filter crosses the incident white light every 1/60th of a second, and the image sensor 206 captures reflected light (R, G, or B) from the observation target, and transfers the resulting image every 1/60th of a second. Specifically, the endoscope apparatus according to one embodiment of the invention frame-sequentially captures an R image, a G image, and a B image every 1/60th of a second, and the substantial frame rate is 20 fps.

The imaging section 200 is formed to be elongated and flexible so that the imaging section 200 can be inserted into a body cavity (e.g., stomach or large intestine), for example. The imaging section 200 includes the light guide fiber 201 that guides the light focused by the light source section 100, an illumination lens 203 that diffuses the light guided by the light guide fiber 201 to illuminate the observation target, and objective lenses 204 and 205 that focus reflected light from the observation target. The objective lenses 204 and 205 are disposed at given intervals so that a given parallax image (hereinafter referred to as "stereo image") can be captured. The objective lenses 204 and 205 respectively form a left image and a right image on the image sensors 206 and 207.

The imaging section 200 also includes an A/D conversion section 209 that converts photoelectrically-converted analog signals output from the image sensors 206 and 207 into digital signals, a memory 210 that stores scope ID information and specific information (including a production variation) about the imaging section 200, and a connector 212 for removably connecting the imaging section 200 and the processor section 300. The image sensors 206 and 207 are monochrome single-chip image sensors, and may be implemented by a CCD sensor, a CMOS sensor, or the like.

The images output from the image sensors 206 and 207 are converted into digital signals by the A/D conversion section 209, and output to an image processing section 301. The memory 210 is connected to the control section 302, and the scope ID information and the specific information (including a production variation) are transmitted to the control section 302.

The processor section 300 includes the image processing section 301 and the control section 302. The image processing section 301 corresponds to the detection device (and the learning device) in a narrow sense. The details of the image processing section 301 are described later.

The display section 400 is a display device (e.g., CRT or liquid crystal monitor) that can display a movie (moving image).

The external I/F section 500 is an interface that allows the user to input information to the endoscope apparatus, for example. The external I/F section 500 includes a power switch (power ON/OFF switch), a shutter button for starting an imaging operation, a mode (e.g., imaging mode) switch button (e.g., a switch for selectively performing a highlight process on an irregular part on the surface of tissue), and the like. The external I/F section 500 outputs the input information to the control section 302.

The details of the image processing section 301 are described below with reference to FIG. 2. The image processing section 301 includes a distance information acquisition section 320, an image construction section 330, a feature quantity calculation section 340, a feature quantity correction section 350, a detection section 360, a highlight processing section 370, a learning section 380, and a learning feature quantity storage section 390.

The stereo image (left image and right image) output from the image sensors 206 and 207 included in the imaging section 200 is input to the image construction section 330 and the distance information acquisition section 320.

The distance information acquisition section 320 performs a matching calculation process on the left image (reference image) included in the captured stereo image and a local area of the right image along an epipolar line that passes through the attention pixel positioned at the center of a local area of the left image to calculate the position at which the maximum correlation is obtained as a parallax. The distance information acquisition section 320 converts the calculated parallax into the distance in the Z-direction to acquire distance information (distance map in a narrow sense). The acquired distance information is output to the feature quantity correction section 350.

Note that the distance information acquisition process may be implemented in various other ways. For example, the distance information may be acquired (calculated) by a Time-of-Flight method using infrared light or the like. When using the Time-of-Flight method, blue light may be used instead of infrared light, for example. In this case, the imaging section 200 need not have a stereo configuration.

The image construction section 330 performs given image processing (e.g., OB process, gain process, and γ process) on the captured stereo image to generate an image that can be output to the display section 400. The resulting image is output to the feature quantity calculation section 340 and the highlight processing section 370.

The feature quantity calculation section 340 calculates the feature quantity from the image output from the image construction section 330. The calculated feature quantity is output to the feature quantity correction section 350. The feature quantity correction section 350 performs a correction process that corrects the feature quantity based on the distance information output from the distance information acquisition section 320. The correction process performed by the feature quantity correction section 350 corresponds to the process based on the distance information. The details of the correction process performed by the feature quantity correction section 350 are described later.

The detection section 360 compares a feature quantity that has been set by the learning section 380 through learning, and is stored in the learning feature quantity storage section 390 with the feature quantity output from the feature quantity correction section 350, and performs a detection process. For example, a pixel having a corrected feature quantity for which the Mahalanobis distance from the learning feature quantity is equal to or less than a threshold value may be set to be the detection target. When the boundary is set within the feature quantity space as described above, the detection target may be determined whether or not the data is included within the correct answer data area.

The highlight processing section 370 performs a highlight process on the detected area, and outputs the resulting data to the display section 400.

The learning section 380 calculates the feature quantity used for the detection process using the corrected feature quantity output from the feature quantity correction section 350. The calculation results are stored in the learning feature quantity storage section 390. The details of the learning process are described later. When implementing supervised learning, given data is input together with the correct answer/incorrect answer information. The user may input the information through the external I/F section 500, for example. In this case, the learning section 380 performs the learning process using the information input through the external I/F section 500, and the corrected feature quantity output from the feature quantity correction section 350 that corresponds to the information input through the external I/F section 500.

3. Learning Process

Figure 3:
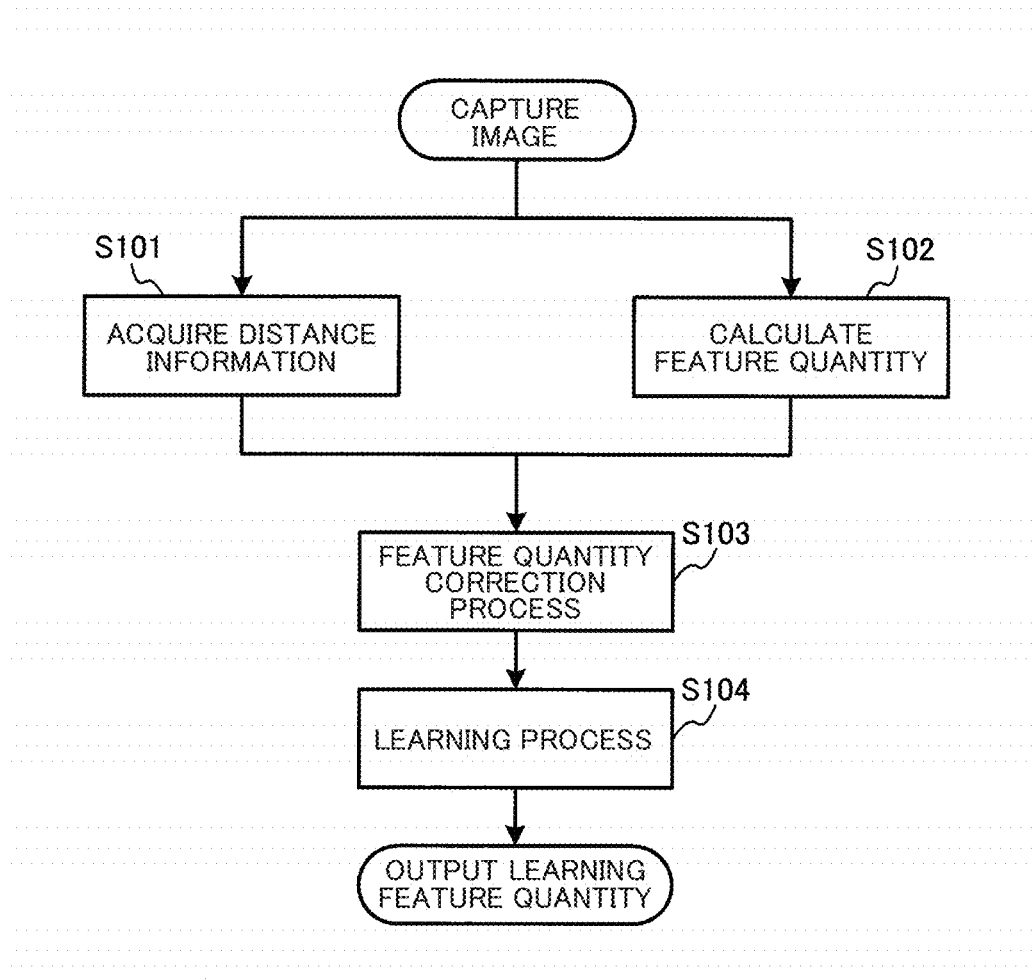
FIG. 3 is a flowchart illustrating a learning process according to one embodiment of the invention.

FIG. 3 illustrates the flow of the learning process. When the learning process has started, the captured image is acquired. The distance information is acquired (S101), and the feature quantity is calculated (S102) based on the acquired captured image. When using the Time-of-Flight method, the distance information is acquired based on sensor information output from a range sensor. Therefore, it is unnecessary to use an image in order to acquire the distance information. Examples of the feature quantity include the color, the brightness, the color difference, the spectrum (e.g., reflectance, transmittance, or radiance), and the like.

The feature quantity is corrected corresponding to the distance (S103). For example, a value (corrected feature quantity) obtained by dividing the feature quantity by the distance (see the following expression (1)) is output. In the expression (1), V is the brightness, d is the distance, and V' is the corrected brightness.

$$V'=V/d \qquad (1)$$

The corrected feature quantity is learned, and the learning feature quantity is output (S104). For example, the mean, the variance, or the like of the input corrected feature quantity is calculated. When using the mean or the variance, the learning feature quantity (learning results) is a set of feature quantities (or one feature quantity). Note that a process that calculates a classification model that corresponds to the boundary in the feature quantity space may be performed as the learning process. When implementing supervised learning, correct answer/incorrect answer information is acquired together with the feature quantity. In this case, a process that acquires the correct answer/incorrect answer information is performed in addition to the process in the step S101 and the process in the step S102, and the learning process is performed in the step S104 using the corrected feature quantity and the correct answer/incorrect answer information.

The correction process may be performed using the irregularity information about the object. An example of a process that extracts extracted irregularity information about an irregular structure from the distance information about the object is described below.

Since a protrusion tends to be captured brightly, and a recess tends to be captured darkly, a correction process that compensates the difference therebetween is performed. However, when the height of the protrusion is small, the depth of the recess is small, or the irregularities are gentle, it is considered that the effects of the irregular structure on the feature quantity within the image are small. Specifically, it is unnecessary to extract all of the irregular structures of the object, and it suffices to extract irregularities having dimensions that affect the brightness. A method that sets an extraction process parameter based on known characteristic information, and extracts the extracted irregularity information from the distance information using an extraction process that utilizes the extraction process parameter is described below. Specifically, an irregular part having the desired dimensional characteristics (i.e., an irregular part having a width within the desired range) is extracted as the extracted irregularity information using the known characteristic information. Since the three-dimensional structure of the object is reflected in the distance information, the distance information includes the desired irregular part, and a structure that differs in dimensions from the desired irregular part. Specifically, the extracted irregularity information acquisition process is a process that excludes an unnecessary structure from the distance information. The extraction process parameter is determined based on the known characteristic information, and the extracted irregularity information is extracted based on the determined extraction process parameter.

A low-pass filtering process using a given size (N×N pixels) is performed on the input distance information to extract rough distance information. The extraction process parameter is adaptively determined based on the extracted rough distance information. The details of the extraction process parameter are described later. The extraction process parameter may be the morphological kernel size (i.e., the size of the structural element) that is adapted to the distance information at the plane position orthogonal to the distance information of the distance map, a low-pass filter that is adapted to the distance information at the plane position, or a high-pass filter that is adapted to the plane position, for example. Specifically, the extraction process parameter is change information that changes an adaptive nonlinear or linear low-pass filter or high-pass filter corresponding to the distance information. Note that the low-pass filtering process is performed to suppress a decrease in the accuracy of the extraction process that may occur when the extraction process parameter changes frequently or significantly corresponding to the position within the image. The low-pass filtering process need not be performed when a decrease in the accuracy of the extraction process does not occur.

The extraction process is performed based on the determined extraction process parameter to extract only the irregular part of the object having the desired size. Since the extracted irregular part is output as the extracted irregularity information (irregularity image) having the same size as that of the captured image (i.e., the image subjected to the highlight process), the feature quantity correction section 350 performs the correction process on the feature quantity of the object that has been determined to be a recess or a protrusion based on the extracted irregularity information.

The details of the extraction process parameter determination process are described below with reference to FIGS. 8A to 8F. In FIGS. 8A to 8F, the extraction process parameter is the diameter of the structural element (sphere) used for an opening process and a closing process (morphological process). FIG. 8A is a view schematically illustrating the surface of the object and the vertical cross section of the imaging section 200.

The extraction process parameter determination process determines the extraction process parameter for extracting only the irregular part that affects the brightness from the surface of the object without extracting a relatively large structure.

In this case, it is necessary to use dimensional information (e.g., width, height, and depth) about the extraction target irregular part. It is possible to extract only the desired irregular part by determining the diameter of the sphere applied to the surface of the object during the opening process and the closing process by using the dimensional information. The diameter of the sphere is set to be smaller than the size of the global structure, and larger than the size of the desired irregular part. FIGS. 8A to 8F illustrate an example in which a sphere that satisfies the above conditions is used for the opening process and the closing process.

FIG. 8B illustrates the surface of the object after the closing process. As illustrated in FIG. 8B, information in which the recesses among the irregular parts having the extraction target dimensions are filled while maintaining the global structure is obtained by determining an appropriate extraction process parameter (i.e., the size of the structural element). The recesses on the surface of tissue can be extracted (see FIG. 8C) by calculating the difference between information obtained by the closing process and the original surface of the object (see FIG. 8A).

FIG. 8D illustrates the surface of the object after the opening process. As illustrated in FIG. 8D, information in which the protrusions among the irregular parts having the extraction target dimensions are removed is obtained by the opening process. The protrusions on the surface of tissue can be extracted (see FIG. 8E) by calculating the difference between information obtained by the opening process and the original surface of the object.

The opening process and the closing process may be performed on the surface of the object using spheres having an identical size. However, since the stereo image is characterized in that the area of the image formed on the image sensor decreases as the distance indicated by the distance information increases, the diameter of the sphere may be increased when the distance indicated by the distance information is short, and may be decreased when the distance indicated by the distance information is long in order to extract an irregular part having the desired size.

FIG. 8F illustrates an example in which the diameter of the sphere is changed with respect to the average distance information when performing the opening process and the closing process on the distance map. Specifically, it is necessary to correct the actual size of the surface of the object using the optical magnification to coincide with the pixel pitch of the image formed on the image sensor in order to extract the desired irregular part with respect to the distance map. Therefore, it is desirable to acquire the optical magnification or the like of the imaging section 200 that is determined based on the scope ID information.

The process that determines the size of the structural element (extraction process parameter) is performed so that the exclusion target shape is not deformed (i.e., the sphere moves to follow the exclusion target shape) when the process using the structural element is performed on the exclusion target shape (when the sphere is moved on the surface in FIG. 8A). The process that determines the size of the structural element (extraction process parameter) is performed so that the extraction target irregular part (extracted irregularity information) is removed (i.e., the sphere does not enter the recess or the protrusion) when the process using the structural element is performed on the extraction target irregular part. Since the morphological process is a well-known process, detailed description thereof is omitted.

The extraction process is not limited to the morphological process. The extraction process may be implemented using a filtering process. For example, when using a low-pass filtering process, the characteristics of the low-pass filter are determined so that the extraction target irregular part can be smoothed, and the exclusion target structure can be maintained. Since the characteristics of the extraction target irregular part and the exclusion target structure can be determined from the known characteristic information, the spatial frequency characteristics thereof are known, and the characteristics of the low-pass filter can be determined.

The low-pass filter may be a known Gaussian filter or bilateral filter. The characteristics of the low-pass filter may be controlled using a parameter σ, and a σ map corresponding to each pixel of the distance map may be generated. When using a bilateral filter, the σ map may be generated using one or both of a brightness difference parameter σ and a distance parameter σ. Note that the term "brightness" used herein in connection with the brightness difference parameter σ refers to the pixel value when the distance map is considered to be an image, and the brightness difference refers to the difference in distance in the Z-direction. The term "distance" used herein in connection with the distance parameter σ refers to the distance between the attention pixel and its peripheral pixel in the XY-direction. A Gaussian filter is represented by the following expression (2), and a bilateral filter is represented by the following expression (3).

$$f(x) = \frac{1}{N} \exp\left(-\frac{(x-x0)^2}{2\sigma^2}\right) \quad (2)$$

$$f(x) = \frac{1}{N} \exp\left(-\frac{(x-x0)^2}{2\sigma_c^2}\right) \times \exp\left(-\frac{(p(x)-p(x0))^2}{2\sigma_v^2}\right) \quad (3)$$

For example, a σ map subjected to a thinning process may be generated, and the desired low-pass filter may be applied to the distance map using the σ map.

The parameter σ that determines the characteristics of the low-pass filter is set to be larger than a value obtained by multiplying the pixel-to-pixel distance D1 of the distance map corresponding to the size of the extraction target irregular part by α (>1), and smaller than a value obtained by multiplying the pixel-to-pixel distance D2 of the distance map corresponding to the size of the lumen and the folds specific to the observation target part by β (<1). For example, the parameter σ may be set to σ=(α*D1+β*D2)/2*Rσ.

Steeper sharp-cut characteristics may be set as the characteristics of the low-pass filter. In this case, the filter characteristics are controlled using a cut-off frequency fc instead of the parameter σ. The cut-off frequency fc may be set so that a frequency F1 in the cycle D1 does not pass through, and a frequency F2 in the cycle D2 passes through. For example, the cut-off frequency fc may be set to fc=(F1+F2)/2*Rf.

Note that Rσ is a function of the local average distance. The output value increases as the local average distance decreases, and decreases as the local average distance increases. Rf is a function that is designed so that the output value decreases as the local average distance decreases, and increases as the local average distance increases.

A recess image can be output by extracting only a negative area obtained by subtracting the low-pass filtering results from the distance map that is not subjected to the low-pass filtering process. A protrusion image can be output by extracting only a positive area obtained by subtracting the low-pass filtering results from the distance map that is not subjected to the low-pass filtering process.

FIGS. 9A to 9D illustrate extraction of the desired irregular part using the low-pass filter. As illustrated in FIG. 9B, information in which the irregular parts having the extraction target dimensions are removed while maintaining the global structure is obtained by performing the filtering process using the low-pass filter on the distance map illustrated in FIG. 9A. Since the low-pass filtering results serve as a reference for extracting the desired irregular parts (see FIG. 9B) even if the opening process and the closing process (see FIGS. 8A to 8F) are not performed, the irregular parts can be extracted (see FIG. 9C) by performing a subtraction process on the original distance map (see FIG. 9A). When using the morphological process, the size of the structural element is adaptively changed corresponding to the rough distance information. When using the filtering process, it is desirable to change the characteristics of the low-pass filter corresponding to the rough distance information. FIG. 9D illustrates an example when changing the low-pass filter corresponding to the rough distance information.

A high-pass filtering process may be performed instead of the low-pass filtering process. In this case, the characteristics of the high-pass filter are determined so that the extraction target irregular part of tissue due to a lesion is maintained while removing the structure of the lumen and the folds specific to the observation target part.

The filter characteristics of the high-pass filter are controlled using a cut-off frequency fhc, for example. The cut-off frequency the may be set so that the frequency F1 in the cycle D1 passes through, and the frequency F2 in the cycle D2 does not pass through. For example, the cut-off frequency the may be set to fhc=(F1+F2)/2*Rf. Note that Rf is a function that is designed so that the output value decreases as the local average distance decreases, and increases as the local average distance increases.

The extraction target irregular part can be extracted by the high-pass filtering process. Specifically, the extracted irregularity information is acquired directly (see FIG. 9C) without performing a difference calculation process.

In the feature quantity correction process performed in the step S103 in FIG. 3, the feature quantity may be corrected using irregularity information extracted by the above method or the like.

4. Detection Process

Figure 4:
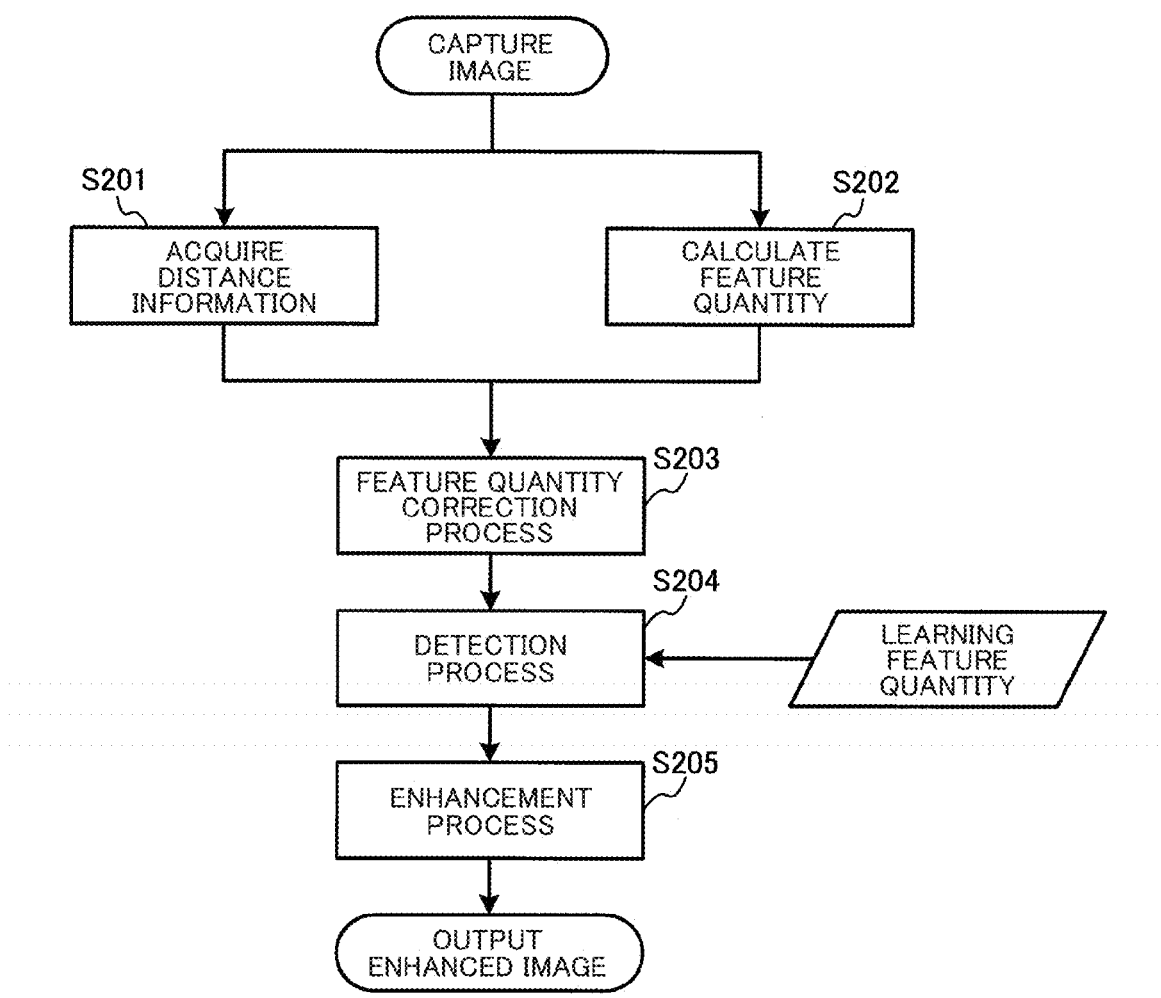
FIG. 4 is a flowchart illustrating a detection process according to one embodiment of the invention.

FIG. 4 illustrates the flow of the detection process. When the detection process has started, the captured image is acquired in the same manner as in the learning process. The distance information is acquired (S201), and the feature quantity is calculated (S202) based on the acquired captured image. The feature quantity is corrected based on the distance information (S203). The correction process performed during the detection process is the same as the correction process performed during the learning process. Therefore, detailed description thereof is omitted. The corrected feature quantity is compared with the learning feature quantity acquired by the learning process (S104 in FIG. 3), and whether or not to detect the target area is determined. For example, the mean and the variance are calculated during the learning process, and the Mahalanobis distance is calculated to detect a pixel for which the Mahalanobis distance is equal to or shorter than a threshold value, or a pixel within the correct answer data boundary is detected based on the positional relationship with the boundary set in the feature quantity space.

The highlight processing section 370 performs the highlight process based on the detected area information. The highlight process may be implemented by a method that colors the detected area, and superimposes the detected area on the input image, or a method that changes the color (e.g., increases the brightness, changes the hue, or increases the chroma) corresponding to the detected area, for example.

5. Modification

The correction process using the expression (1), and the correction process on the feature quantity corresponding to a recess/protrusion have been described above as the correction process performed on the feature quantity. Note that the correction process is not limited thereto. Another correction process may also be employed.

Figure 10:
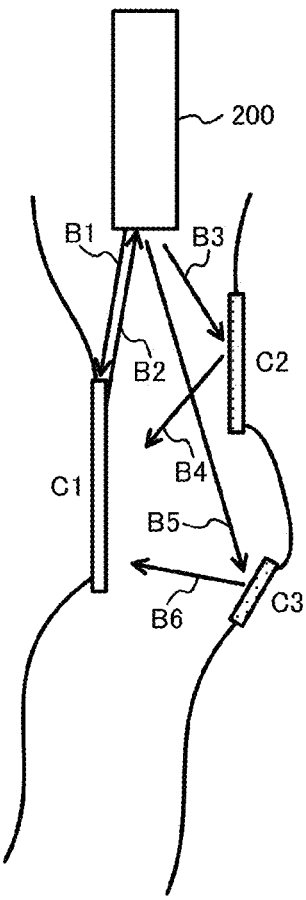
FIG. 10 is a view illustrating multiple reflection.
Figure 11:
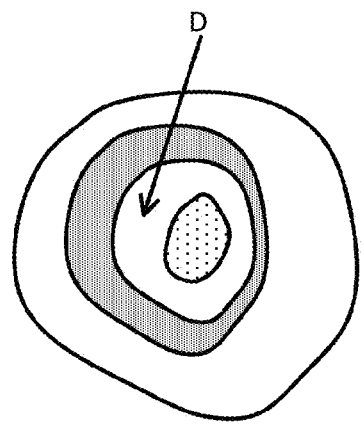
FIG. 11 is a view illustrating an example in which the color of an image changes due to multiple reflection.

An example in which a luminal object (see FIG. 10) is observed using the endoscope apparatus is described below. The luminal object may be the gullet, for example. In this case, when light is applied to the luminal wall, a red component (i.e., the color of the luminal wall) is mainly reflected from the luminal wall. The ratio of the red component increases through multiple reflection, and reddish light is observed. FIG. 11 illustrates an example of an image of the luminal object captured using the endoscope apparatus. The wall surface of the gullet has an almost uniform color. However, the object within the image does not have a uniform color due to the effects of multiple reflection.

Therefore, when the image is used directly for learning, since the color observed varies due to the characteristics of multiple reflection that differ depending on the structure, it may be impossible to achieve correct learning/detection. Specifically, since multiple reflection due to the structure may change the feature quantity, it is desirable to perform the feature quantity correction process taking account of multiple reflection in order to achieve correct learning/detection.

According to the modification, the three-dimensional shape of the lumen and the reflection pattern are learned in advance, and the correction process is performed using the reflection pattern that matches the calculated three-dimensional shape information. A change in color due to multiple reflection is calculated from the reflection pattern and the observed color, and a correction value that cancels the change in color is calculated. Specifically, the relationship between the three-dimensional shape and the reflection pattern calculated therefrom is stored in a table using teacher data, and the correction process is performed using the information stored in the table.

A specific example is described below with reference to the drawings. The characteristics of light at the luminal position C1 in FIG. 10 corresponding to the observation position D of the image illustrated in FIG. 11 are discussed below. Light emitted from the light source indicated by the line B1 is normally reflected at the luminal position C1, and reflected light indicated by the line B2 is captured by the endoscope apparatus.

However, multiple reflection occurs when observing a luminal object. Therefore, reflected light from the luminal position C2 and reflected light from the luminal position C3 are also applied to the luminal position C1, for example. The reflected light from the luminal position C2 that is applied to the luminal position C1 is indicated by the line B4. The reflected light from the luminal position C2 occurs when light emitted from the light source (see the line B3) is reflected at the luminal position C2. The reflected light from the luminal position C3 that is applied to the luminal position C1 is indicated by the line B6. The reflected light from the luminal position C3 occurs when light emitted from the light source (see the line B5) is reflected at the luminal position C3. Specifically, the reflected light indicated by the line B2 occurs due to the light indicated by the line B1, the light indicated by the line B4, and the light indicated by the line B6.

Since light that is reflected by the red area of the luminal wall becomes red, the color of the observation position D within the image corresponding to the luminal position C1 is shifted toward the red region as compared with the case where multiple reflection does not occur. In this case, the pattern of the incident light and the pattern of the reflected light (see FIG. 11) may be calculated from structural information, and linked to each other.

Figure 12:
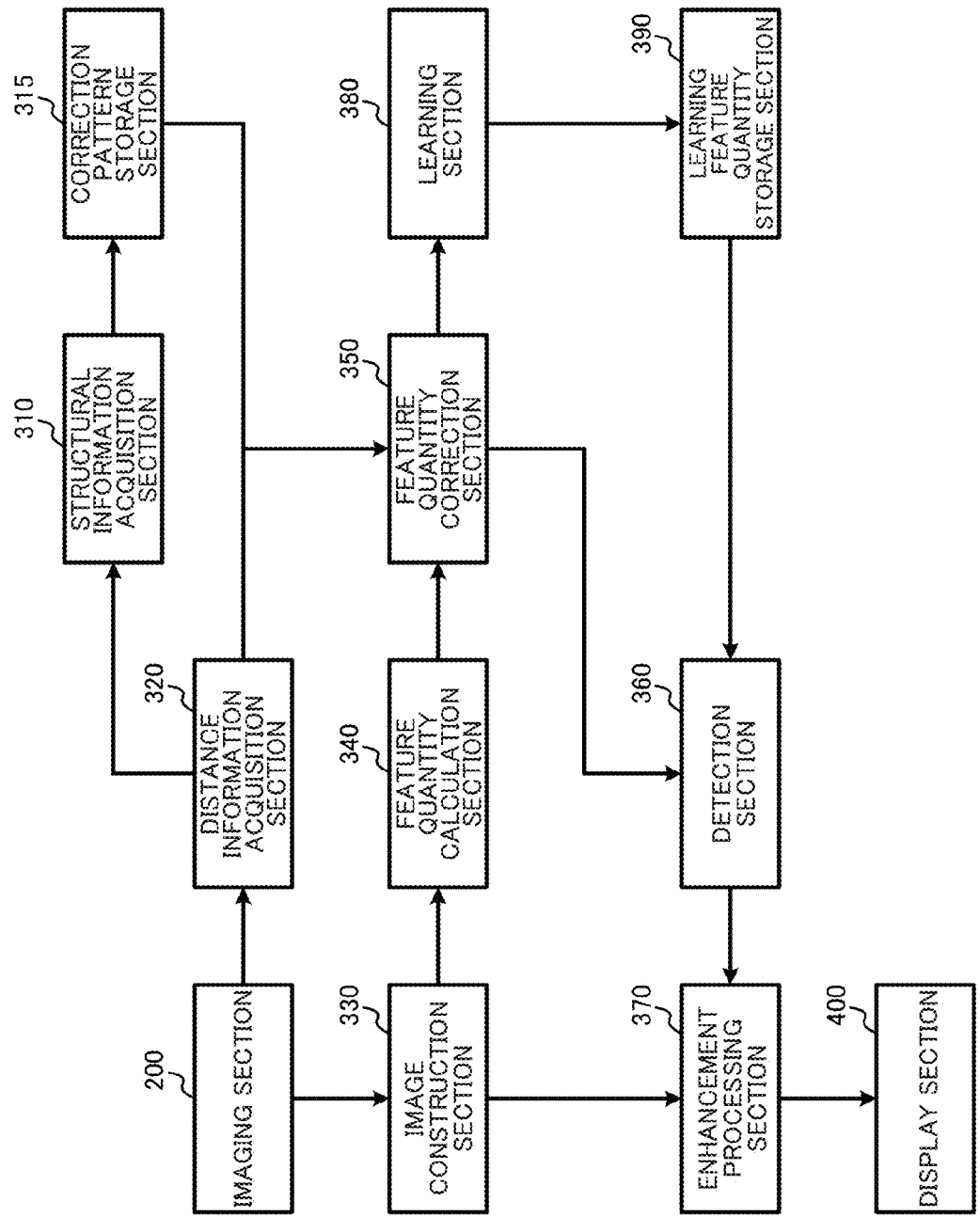
FIG. 12 illustrates another configuration example of a detection device according to one embodiment of the invention.

FIG. 12 illustrates a configuration example of a detection device (image processing section 301) according to the modification. As illustrated in FIG. 12, the detection device includes a structural information acquisition section 310 that calculates structural information from the acquired distance information, and a correction pattern storage section 315 that stores the structural information calculated by the structural information acquisition section 310 and a reflection pattern in a linked manner, in addition to the elements illustrated in FIG. 2. Note that the correction pattern storage section 315 may be configured as a database (structural information database) in which the structural information and the reflection pattern are linked to each other.

The feature quantity correction section 350 acquires the corresponding reflection pattern using the structural information acquired by the structural information acquisition section 315 referring to a structural pattern storage section. The feature quantity correction section 350 calculates the correction value from the reflection pattern, and uses the calculated correction value for the feature quantity correction process together with the distance information.

Figure 13:
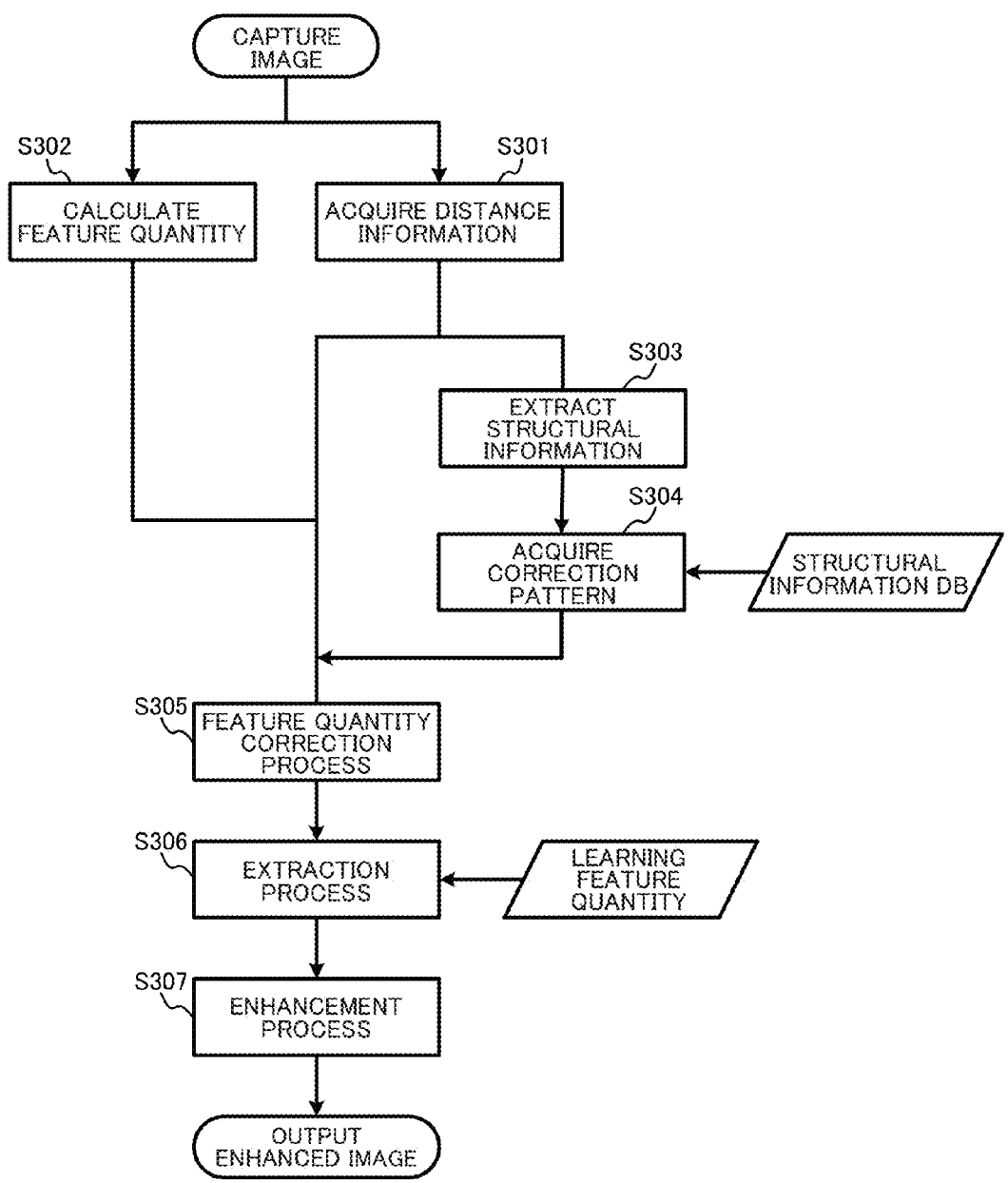
FIG. 13 is another flowchart illustrating a detection process according to one embodiment of the invention.

FIG. 13 is a flowchart illustrating the process according to the modification. In steps S301 and S302, the distance information acquisition process and the feature quantity calculation process are respectively performed in the same manner as in the steps S201 and S202. After the distance information has been acquired, the structural information (three-dimensional structure) is acquired based on the acquired distance information (S303). The reflection pattern is read from the corresponding structure stored in the structural information database to determine the correction amount (S304). In the feature quantity correction process performed in a step S305, the feature quantity is corrected in the same manner as described above, except that the correction amount determined in the step S304 is also used. Steps S306 and S307 (process performed after correcting the feature quantity) are performed in the same manner as the steps S204 and S205 in FIG. 4.

A change in feature quantity (e.g., color or spectrum) of the object can be corrected by taking account of multiple reflection due to the three-dimensional structure, and the target area can be extracted with high accuracy.

The spectral characteristics of the illumination light synthesized at a given luminal position are described in detail below. The illumination light applied directly from the end of the endoscope, and the reflected light from the luminal position C2 and the luminal position C3 are synthesized at the luminal position C1 illustrated in FIG. 10 corresponding to the observation position D of the image illustrated in FIG. 11.

When the spectral reflectivity of the surface of tissue is referred to as $R(\theta)$, and the spectral radiant intensity of the illumination light applied from the end of the endoscope is referred to as $E(\zeta)$, the spectral characteristics $I_1$ of the illumination light synthesized at the luminal position C1 can be approximated using a model that takes account of single reflection from the peripheral surface of tissue (see the following expression (4)). Note that $\theta$ is the angle with respect to a perpendicular to a plane that comes in contact with an arbitrary position of the surface of tissue, and $\zeta$ is the angle with respect to the optical axis of the illumination optical system provided on the end of the endoscope.

$$I_1 = E(\zeta_1)/r_1^2 + E(\zeta_2)/r_2^2 \times R(\theta_{21})/r_{21}^2 + E(\zeta_3)/r_3^2 \times R(\theta_{31})/r_{31}^2 \quad (4)$$

Note that $\zeta_1$ is the angle in the direction of the luminal position C1, $\zeta_2$ is the angle in the direction of the luminal position C2, and $\zeta_3$ is the angle in the direction of the luminal position C3. $\theta_{21}$ is the angle in the direction from the luminal position C2 to the luminal position C1, and $\theta_{31}$ is the angle in the direction from the luminal position C3 to the luminal position C1, $r_1$ is the distance from the end of the endoscope to the luminal position C1, $r_2$ is the distance from the end of the endoscope to the luminal position C2, $r_3$ is the distance from the end of the endoscope to the luminal position C3, $r_{21}$ is the distance from the luminal position C2 to the luminal position C1, and $r_{31}$ is the distance from the luminal position C3 to the luminal position C1.

Since the spectral reflectivity $R(\theta)$ of tissue increases corresponding to the red wavelength region as compared with the blue wavelength region and the green wavelength region (i.e., hemoglobin absorbs blue light and green light), the reflected light in the second term and the third term of the expression (4) has a high red-wavelength radiant intensity as compared with the spectral radiant intensity $E(\zeta)$ of the illumination light emitted from the endoscope.

As a result, the spectral characteristics $I_1$ of the illumination light at the luminal position C1 show a high red radiant intensity, and the color of the image at the observation position D is observed so that the red signal value is higher as compared with the case where reflected light is absent.

Specifically, the color correction amount for accurately detecting a lesion at the observation position D of the image can be estimated by determining the pattern (reflection pattern) of reflected light due to the peripheral luminal structure that affects the spectral characteristics $I_1$ of the illumination light at the luminal position C1. The reflection pattern is defined by the integral value of the reflection intensity toward the observation position D with respect to each pixel of the image (corresponding to the second term and the third term of the expression (4)).

When the structural information calculated from the distance information about the distance to the object, and the corresponding reflection pattern (integral value of reflection intensity) are learned in advance, the reflection pattern based on the learning results can be estimated when the structural information about the successively captured image is input, and the color correction amount can be determined using the reflection pattern.

Note that the color correction amount may been determined in advance from the reflection pattern using a table.

The color correction amount may be estimated directly instead of estimating the reflection pattern through learning.

6. Specific Example

Figure 2:
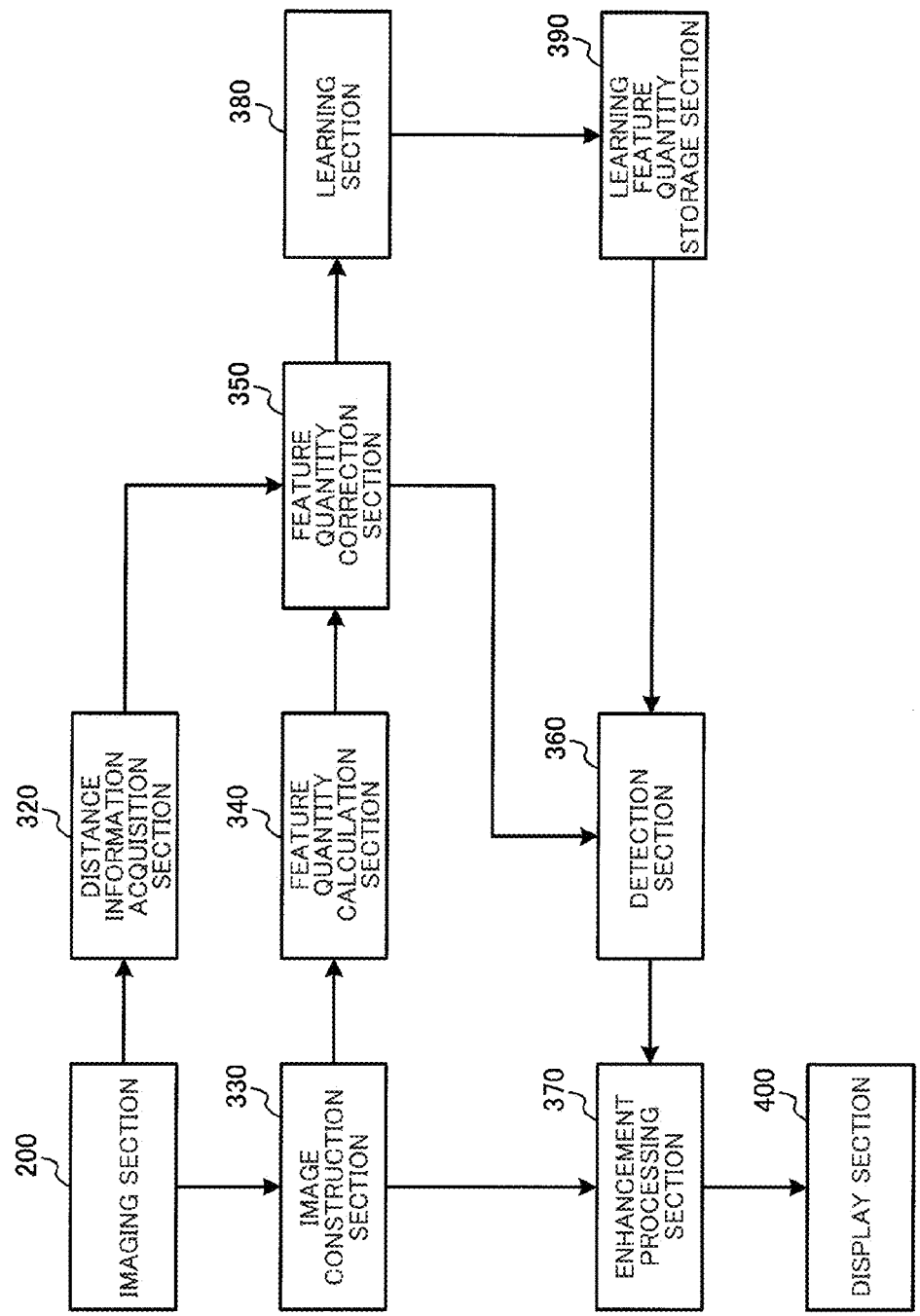
FIG. 2 illustrates a configuration example of a detection device according to one embodiment of the invention.

According to one embodiment of the invention, a detection device (corresponding to the image processing section 301 included in the endoscope apparatus illustrated in FIG. 1) includes an image acquisition section (corresponding to the image construction section 330) that acquires an image that has been captured by the imaging section 200, and includes an image of the object, the distance information acquisition section 320 that acquires the distance information based on the distance from the imaging section 200 to the object when the imaging section 200 has captured the image, the feature quantity calculation section 340 that calculates a feature quantity from the acquired image, the feature quantity relating to at least one of the color, the brightness, the color difference, and the spectrum of the object, the learning feature quantity storage section 390 that stores the learning feature quantity calculated by the learning process based on the distance from the imaging section 200 to the object, and the detection section 360 that detects the target area from the image based on the learning feature quantity, the distance information, and the feature quantity (see FIG. 2).

The term "learning feature quantity" used herein includes information that indicates the learning results. When a process that calculates the mean or the variance of the feature quantities of a plurality of pieces of learning data is performed as the learning process, the information that indicates the learning results is included within the scope of the term "learning feature quantity" since the learning results indicate the mean or the variance of the feature quantities. When the learning results indicate the boundary (classification model in a broad sense) in the feature quantity space (see FIGS. 5C and 5D), it may be considered that the learning results do not indicate the feature quantity. However, the term "learning feature quantity" is used herein to refer to a wide range of information obtained by the learning process utilizing the feature quantity, and includes the classification model and the like.

The above configuration makes it possible to detect the target area from the image based on the distance information about the distance from the imaging section 200 to the object, the feature quantity (e.g., color) calculated from the image, and the learning feature quantity (i.e., the results of the learning process). An object having given characteristics may appear to have different characteristics within the image depending on the distance or a difference in structure (see FIGS. 6A and 6B). In order to accurately detect the object having given characteristics from the image, it is necessary to suppress a change in characteristics within the image during the learning process and the detection process. According to one embodiment of the invention, the desired object is accurately detected by utilizing the distance information in view of the fact that the distance or the structure on the surface of the object can be acquired based on the distance information. A change in characteristics within the image due to multiple reflection may also be taken into consideration (see the modification). In this case, the desired object can also be accurately detected by utilizing the distance information. Specifically, the feature quantity correction process may be performed while calculating the structural information from the distance information, and specifying the reflection pattern from the structural information.

In order to perform the detection process with high accuracy, a value acquired by the learning process that takes account of the distance from the imaging section 200 to the object is stored as the learning feature quantity. The detection device may not include the learning device 40 that performs the learning process (see FIG. 7A). In this case, since the method for acquiring the learning data that is input during the learning process is not limited, the feature quantity correction process that utilizes the distance information and the like may not be performed during the learning process. For example, the problem that may occur in connection with the feature quantity acquired from the captured image can be solved without performing the correction process or the like by providing an environment in which the object can be captured at a constant brightness independently of the distance from the imaging section by adjusting the placement of the light source or the like. When implementing a process that detects given tissue from an in vivo image, it is indispensable to capture an image using the endoscope apparatus during the detection process. However, when a structure that does not change in color characteristics or the like after being removed from tissue is the detection target, it is possible to arbitrarily set the imaging environment by utilizing the structure removed from tissue during the learning process. However, since the entire object is captured at a given reference distance independently of the actual distance information when such an ideal environment is provided, the distance from the imaging section 200 to the object is taken into consideration. Specifically, the expression "learning process based on the distance from the imaging section to the object" used herein is not limited to the case where a process that utilizes the distance information is performed during the learning process, but covers an arbitrary learning process that reflects the distance. For example, the expression "learning process based on the distance from the imaging section to the object" used herein includes a learning process that utilizes the above ideal environment.

The learning feature quantity storage section 390 may store the learning feature quantity based on the feature quantity that has been subjected to the correction process based on the distance, and the detection section 360 may perform the correction process on the feature quantity calculated by the feature quantity calculation section 340 based on the distance information acquired by the distance information acquisition section 320, and detect the target area based on the feature quantity subjected to the correction process and the learning feature quantity.

According to this configuration, it is possible to improve the accuracy of the detection process by performing the correction process on the feature quantity based on the distance information. The correction process may be a correction process that compensates a change in feature quantity due to a difference in distance information, or a change in feature quantity due to a difference in irregular structure of the object that can be acquired based on the distance information. More specifically, the correction process may be a correction process that utilizes the expression (1), or may be a correction process on the feature quantity corresponding to a recess/protrusion. The correction process on an irregular part may change the correction amount corresponding to the depth or the width of a recess, or the height or the width of a protrusion. According to this configuration, since a change in feature quantity within the image due to the distance information or the irregular structure can be suppressed, an object having given characteristics also has the given (constant in a narrow sense)

characteristics within the image independently of the distance and the structure, and the detection process can be performed with high accuracy.

The technique disclosed in JP-A-2002-342758 normalizes the image using the distance to generate a normalized image, and generates a feature vector from the normalized image. In this case, since it is necessary to perform the normalization process on the entire image, the calculation cost increases. According to one embodiment of the invention, since the feature quantity having an amount of data smaller than that of the image is calculated from the image, and corrected using the distance information, it is possible to reduce the calculation cost.

The feature quantity correction process using the distance information may not be performed during the learning process. Specifically, the learning feature quantity storage section 390 may store the learning feature quantity calculated by the learning process based on the distance from the imaging section 200 to the object, and the detection section 360 may perform the correction process on the feature quantity calculated by the feature quantity calculation section 340 based on the distance information acquired by the distance information acquisition section 320, and detect the target area based on the feature quantity subjected to the correction process and the learning feature quantity.

The detection device may include the learning section 380 that performs the learning process on the feature quantity that has been calculated by the feature quantity calculation section 340 and corresponds to the object based on the distance information acquired by the distance information acquisition section 320 (see FIG. 2). The learning feature quantity storage section 390 may store the results of the learning process performed by the learning section 380 as the learning feature quantity.

According to this configuration, since the detection device 30 includes the learning section 380 (see FIG. 7B), the detection process and the learning process can be implemented by the detection device 30. In this case, since the image obtained by capturing an object similar to the target of the detection process can be used for the learning process, it is possible to implement a learning process that further reflects the characteristics of the target of the detection process. For example, the detection target tissue observed using the endoscope may differ in color depending on the subject. In this case, the detection range may be increased, or may be limited to a range close to the average value and the median value during the learning process from the viewpoint of improving versatility. Therefore, the detection range may include a feature quantity that cannot be possessed by the target tissue of a given subject, or the color of the target tissue of a given subject may fall outside the detection range. However, since learning that takes account of an individual variation can be achieved by performing the learning process using an image obtained by capturing the actual subject, the detection accuracy can be improved as compared with the case of using versatile learning results. In this case, it is considered that individual learning is performed using the results of versatile learning. In such a case, the user may input teacher data (that indicates whether or not the processing target is correct answer data) depending on the situation.

The detection device may include the highlight processing section 370 that performs the highlight process on the target area detected by the detection section 360 (see FIG. 2).

This makes it possible to perform the highlight process on the detected target area. The highlight process may be a process that improves visibility, for example. When the target area is fat, it is possible to improve the effect of suppressing nerve damage by improving the visibility of an area in which it is likely that nerves are present.

The detection device may include a three-dimensional structural information calculation section (corresponding to the structural information acquisition section 310 in FIG. 12) that calculates three-dimensional structural information about the object from the distance information. The learning feature quantity storage section 390 may store the learning feature quantity based on the feature quantity that has been subjected to the correction process based on the distance information and the three-dimensional structural information about the object, and the detection section 360 may perform the correction process on the feature quantity calculated by the feature quantity calculation section 340 based on the distance information acquired by the distance information acquisition section 320 and the three-dimensional structural information about the object calculated by the three-dimensional structural information calculation section, and may detect the target area based on the feature quantity that has been subjected to the correction process, and the learning feature quantity.

The embodiments of the invention may be applied to a learning device that includes an image acquisition section (corresponding to the image construction section 330) that acquires an image that has been captured by the imaging section 200, and includes an image of the object, the distance information acquisition section 320 that acquires the distance information based on the distance from the imaging section 200 to the object when the imaging section 200 has captured the image, the feature quantity calculation section 340 that calculates the feature quantity of the object from the acquired image, the learning section 380 that performs the learning process on the feature quantity that has been calculated by the feature quantity calculation section 340 and corresponds to the object based on the distance information acquired by the distance information acquisition section 320, and the learning feature quantity storage section 390 that stores the learning feature quantity calculated by the learning process performed by the learning section 380.

This makes it possible to implement a learning device that performs the learning process based on the distance information. It is important to suppress the effects of a difference in distance or a difference in structure during the learning process in order to improve the detection accuracy.

The learning device may include a three-dimensional structural information calculation section (corresponding to the structural information acquisition section 310 in FIG. 12) that calculates three-dimensional structural information about the object from the distance information. The learning section 380 may perform the learning process on the feature quantity that has been calculated by the feature quantity calculation section and corresponds to the object based on the distance information acquired by the distance information acquisition section 320 and the three-dimensional structural information calculated by the three-dimensional structural information calculation section 340, and the learning feature quantity storage section 390 may store the learning feature quantity based on the feature quantity that has been subjected to the correction process based on the distance information and the three-dimensional structural information about the object.

Note that part or most of the processes performed by the detection device or the learning device may be implemented by a program. In this case, the detection device, the learning device or the like is implemented by causing a processor (e.g., CPU) to execute a program. Specifically, a program stored in a non-transitory information storage device is read, and executed by a processor (e.g., CPU). The information storage device (computer-readable device) stores a program, data, and the like. The function of the information storage device may be implemented by an optical disk (e.g., DVD or CD), a hard disk drive (MD), a memory (e.g., memory card or ROM), or the like. The processor (e.g., CPU) performs various processes according to the embodiment of the invention based on the program (data) stored in the information storage device. Specifically, a program that causes a computer (i.e., a device including an operation section, a processing section, a storage section, and an output section) to function as each section according to the embodiment of the invention (i.e., a program that causes a computer to execute the process implemented by each section) is stored in the information storage device.

The detection device or the like may include a processor and a memory. The processor may be a central processing unit (CPU), for example. Note that the processor is not limited to a CPU. Various types of processors such as a graphics processing unit (GPU) or a digital signal processor (DSP) may also be used. The processor may be a hardware circuit that includes an application-specific integrated circuit (ASIC). The memory stores a computer-readable instruction. Each section of the detection device or the like is implemented by causing the processor to execute the instruction. The memory may be a semiconductor memory (e.g., SRAM or DRAM), a register, a hard disk, or the like. The instruction may be an instruction included in an instruction set of a program, or may be an instruction that causes a hardware circuit of the processor to operate.

Although only some embodiments of the invention have been described in detail above, those skilled in the art will readily appreciate that many modifications are possible in the embodiments without materially departing from the novel teachings and advantages of the invention. Accordingly, all such modifications are intended to be included within scope of this invention. Any term cited with a different term having a broader meaning or the same meaning at least once in the specification and the drawings can be replaced by the different term in any place in the specification and the drawings. The configuration and the operation of the detection device, the learning device, and the like are not limited to those described in connection with the above embodiments. Various modifications and variations may be made.

What is claimed is:

1. A detection device comprising:
a processor comprising hardware, wherein the processor is configured to:
acquire an image of a luminal object, wherein the image has been captured by an image sensor;
acquire distance information on a distance from the image sensor to the luminal object at the time the image sensor captured the image;
calculate a feature quantity from the image, wherein the feature quantity relates to at least one of a color, a brightness, a color difference, and a spectrum of the luminal object;
perform a correction process on the feature quantity using structural information about the luminal object extracted from the image based on the distance information;
acquire a learning feature quantity stored in a learning feature quantity storage, wherein the learning feature quantity is calculated by a learning process performed on the feature quantity that has been subjected to the correction process using the structural information about the luminal object extracted from the image based on the distance information; and
detect a target area from the image based on the learning feature quantity and the feature quantity that has been subjected to the correction process using the structural information about the luminal object extracted from the image based on the distance information;
wherein the structural information is information about irregular structures of the luminal object.

2. The detection device as defined in claim 1, wherein the processor is further configured to:
calculate the learning feature quantity by performing the learning process on the feature quantity that has been subjected to the correction process using the structural information about the luminal object extracted from the image based on the distance information.

3. The detection device as defined in claim 1,
wherein the processor is further configured to:
perform a highlight process on the image to highlight the target area.

4. The detection device as defined in claim 1, wherein the processor is further configured to:
acquire the structural information by acquiring three-dimensional structural information about the luminal object from the distance information.

5. A learning device comprising:
a processor comprising hardware, wherein the processor is configured to:
acquire an image of a luminal object, wherein the image has been captured by an image sensor;
acquire distance information on a distance from the imaging sensor to the luminal object at the time the image sensor captured the image;
calculate a feature quantity from the image, wherein the feature quantity relates to at least one of a color, a brightness, a color difference, and a spectrum of the luminal object;
perform a correction process on the feature quantity using structural information about the luminal object extracted from the image based on the distance information; acquire a learning feature quantity by performing a learning process on the feature quantity that has been subjected to the correction process; and
controlling a learning feature quantity storage to store the learning feature quantity calculated by the learning process performed on the feature quantity that has been subjected to the correction process;
wherein the structural information is information about irregular structures of the luminal object.

6. The learning device as defined in claim 5, wherein the processor is further configured to:
acquire the structural information by acquiring three-dimensional structural information about the luminal object from the distance information.

7. A detection method comprising causing a computer to perform:
acquiring an image of a luminal object, wherein the image has been captured by an image sensor;
acquiring distance information on a distance from the image sensor to the luminal object at the time the image sensor captured the image;
calculating a feature quantity from the image, wherein the feature quantity relates to at least one of a color, a brightness, a color difference, and a spectrum of the luminal object;

performing a correction process on the feature quantity using structural information about the luminal object extracted from the image based on the distance information;

acquiring a learning feature quantity stored in a learning feature quantity storage, wherein the learning feature quantity is calculated by a learning process performed on the feature quantity that has been subjected to the correction process using the structural information about the luminal object extracted from the image based on the distance information; and detecting a target area from the image based on the learning feature quantity and the feature quantity that has been subjected to the correction process using the structural information about the luminal object extracted from the image based on the distance information;

wherein the structural information is information about irregular structures of the luminal object.

8. A learning method comprising causing a computer to perform:

acquiring an image of a luminal object, wherein the image has been captured by an image sensor;

acquire distance information on a distance from the image sensor to the object at the time the image sensor captured the image;

calculate a feature quantity from the image, wherein the feature quantity relates to at least one of a color, a brightness, a color difference, and a spectrum of the luminal object;

perform a correction process on the feature quantity using structural information about the luminal object extracted from the image based on the distance information;

acquire a learning feature quantity by performing a learning process on the feature quantity that has been subjected to the correction process; and controlling a learning feature quantity storage to store the learning feature quantity acquired by the learning process performed on the feature quantity that has been subjected to the correction process;

wherein the structural information is information about irregular structures of the luminal object.

9. A computer-readable storage device with an executable program stored thereon, wherein the executable program instructs a computer to perform:

acquiring an image of a luminal object, wherein the image has been captured by an image sensor;

acquiring distance information on a distance from the image sensor to the luminal object at the time the image sensor captured the image;

calculating a feature quantity from the image, wherein the feature quantity relates to at least one of a color, a brightness, a color difference, and a spectrum of the luminal object;

performing a correction process on the feature quantity using structural information about the luminal object extracted from the image based on the distance information;

acquiring a learning feature quantity stored in a learning feature quantity storage, wherein the learning feature quantity is calculated by a learning process performed on the feature quantity that has been subjected to the correction process using the structural information about the luminal object extracted from the image based on the distance information; and detecting a target area from the image based on the learning feature quantity and the feature quantity that has been subjected to the correction process using the structural information about the luminal object extracted from the image based on the distance information;

wherein the structural information is information about irregular structures of the luminal object.

10. A computer-readable storage device with an executable program stored thereon, wherein the executable program instructs a computer to perform:

acquiring an image of a luminal object, wherein the image has been captured by an image sensor;

acquiring a distance information on a distance from the image sensor to the luminal object at the time the image sensor captured the image;

calculating a feature quantity from the image, wherein the feature quantity relates to at least one of a color, a brightness, a color difference, and a spectrum of the luminal object;

performing a correction process on the feature quantity using structural information about the luminal object extracted from the image based on the distance information;

acquiring a learning feature quantity by performing a learning process on the feature quantity that has been subjected to the correction process; and controlling a learning feature quantity storage to store the learning feature quantity acquired by the learning process performed on the feature quantity that has been subjected to the correction process;

wherein the structural information is information about irregular structures of the luminal object.

11. The detection device according to claim 1, wherein the processor is further configured to:

acquire the information about irregular structures of the luminal object by performing a closing process based on the distance information.

12. The detection device according to claim 1, wherein the processor is further configured to:

acquire the information about irregular structures of the luminal object by performing an opening process based on the distance information.

13. The detection device according to claim 1, wherein the processor is further configured to:

acquire the information about irregular structures of the luminal object by performing a low-pass filtering process based on the distance information.

14. The detection device according to claim 1, wherein the processor is further configured to:

acquire the information about irregular structures of the luminal object by performing a high-pass filtering process based on the distance information.

* * * * *